2,697,115

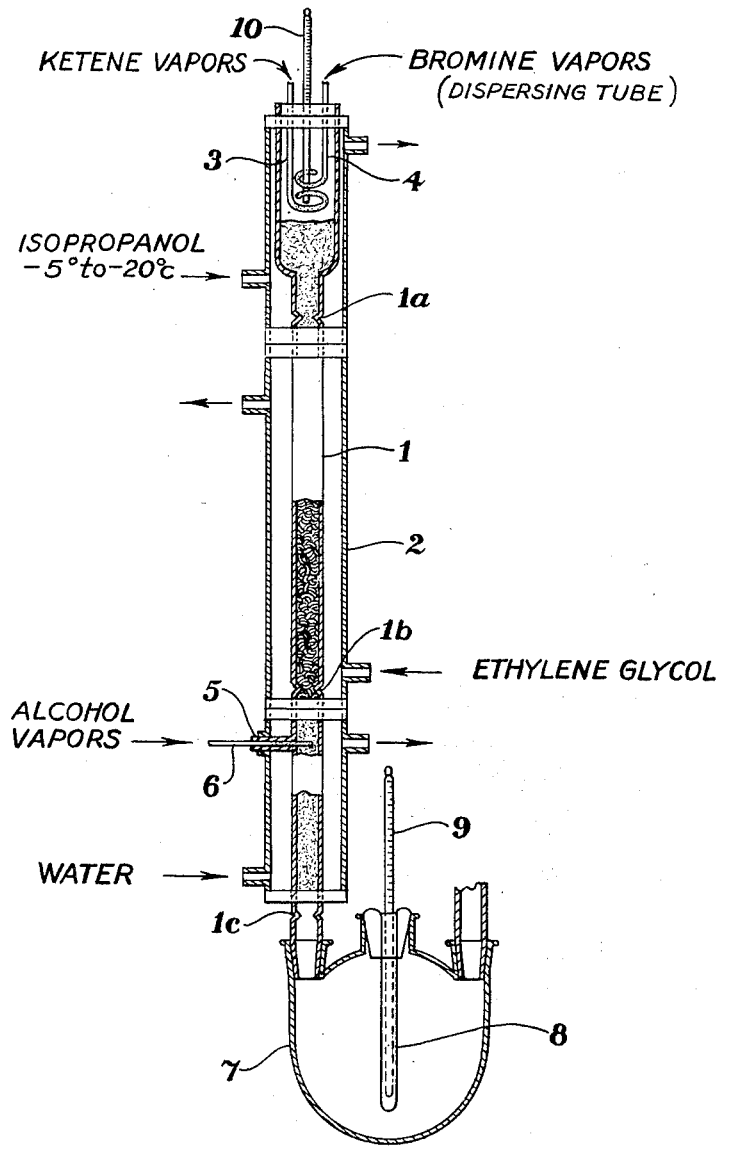

PROCESS OF PRODUCING LOWER ALKYL ESTERS OF MONOHALOACETIC ACID FROM KETENE, HALOGENS, AND ALCOHOLS

Egbert H. Clower and Flaven E. Johnson, Kingsport, Tenn., assignors to Eastman Kodak Company, Rochester, N. Y., a corporation of New Jersey Application May 19, 1951, Serial No. 227,152

4 Claims. (Cl. 260—487)

This invention relates to the production of lower alkyl esters of monohaloacetic acid, such, for example, as ethyl bromoacetate, methyl bromoacetate, ethyl chloroacetate, methyl chloroacetate, and the like. More particularly, it relates to a continuous vapor-phase process of producing these esters by reacting ketene with halogen and reacting the product with an alcohol.

The reactions involved are the following:

(1) $\underset{\text{Ketene}}{CH_2{:}C{:}O} + \underset{\text{Halogen}}{X_2} \longrightarrow \underset{\text{Haloacetyl halide}}{XCH_2 \cdot CX{:}O}$ (2) $\underset{\text{Haloacetyl halide}}{XCH_2 \cdot CX{:}O} + \underset{\text{Alcohol}}{ROH} \longrightarrow \underset{\substack{\text{Alkyl halo-} \\ \text{acetate}}}{XCH_2 \cdot \underset{\underset{O}{\|}}{C}-OR} + \underset{\substack{\text{Hydrogen} \\ \text{halide}}}{HX}$ These reactions are known in the prior art, and no novelty is claimed for them. However, when alkyl haloacetates are made by the methods shown in the prior art, it is difficult to obtain good yields of the esters of monohaloacetic acid, because considerable amounts of the esters of di- and tri-haloacetic acids are formed. Moreover, the intermediate products in the reactions shown above, namely the haloacetyl halides, are very unpleasant substances to handle.

We have discovered that lower alkyl esters of monohaloacetic acid, in which the halogen is a "middle halogen," that is, chlorine or bromine, can be continuously prepared in good yield by reacting ketene with the halogen, in the vapor phase, with refrigeration to keep the temperature below 150° C., maintaining the haloacetyl halide thus formed in the vapor phase, and, in another portion of the same apparatus, reacting it with the vapor of a lower aliphatic monohydric alcohol.

The attached figure represents one form of apparatus in which our process can be carried out. It will be understood that the apparatus represented in the figure is illustrative only. It is a laboratory form of apparatus. The materials of construction and in particular the dimensions may be varied considerably. In the figure, the reaction tube 1 is a vertical Pyrex glass tube 60 cm. in length, similar in shape to the inner tube of an ordinary Liebig condenser, but with three constrictions, 1a, 1b and 1c, 1a being slightly below the widened upper portion of 1, 1c slightly above the lower end, and 1b about ⅓ of the distance from 1c to 1a. The diameter of 1 throughout most of its length is 1.5 cm., the diameter of the widened upper portion being 4 cm., and the length of the widened upper portion being 12 cm. Approximately 15 cm. above the bottom of 1, and a few centimeters below the constriction 1b, 1 is provided with a side-arm 5, of 5 mm. glass tubing.

2 is a jacket surrounding 1 from its top to a point slightly above 1c. This jacket is made up of three sections, each end of each of which is closed by an alkyd resin-coated rubber stopper which fits tightly around 1. Each section of 2 is provided with an inlet and an outlet for circulating fluid. The middle section of 1 is packed with ¼″ Berl saddles. The top and bottom sections of 1 are packed with glass wool.

The upper end of 1 is closed by a 3-hole, alkyd resin-coated rubber stopper, carrying a thermometer 10 and two glass tubes 3 and 4, of 5 mm. internal diameter, which have gas-dispersing tips. 3 projects 8 cm. into the widened portion of 2, and 4 projects 6 cm. into this same portion.

The lower section of 2 has an opening fitted around the side-arm 5. The side-arm 5 is provided with a 1-hole, alkyl resin-coated rubber stopper, through which a fritted glass dispersing tube enters the reaction tube 1.

The tapered lower end of the reaction tube 1 is fitted, by a ground joint, to one neck of a three-necked flask 7, another neck of which is connected, by a ground joint, to a fractionating column packed with glass helices. The third neck of the flask is provided with a thermometer well 8, in which is a thermometer 9.

The ketene feed line is connected to tube 3, and the bromine feed line is connected to tube 4. The alcohol vapor feed line is connected to tube 6. Isopropanol cooled to −5° C. to −20° C. by means of a reciprocating compressor of a type commonly used in refrigerating engineering for circulating refrigerants, is circulated in the top section of jacket 2. Ethylene glycol, or other liquid having a similar boiling range, is circulated at 150° C. in the middle section of jacket 2. In the lower section of jacket 2, water at 85° C. is circulated. The 3-necked flask is maintained at a temperature of 170–175° C.

Prior to introducing the reactants into the apparatus, the system is thoroughly purged with dry nitrogen, and during the reaction, the system is protected from atmospheric moisture by calcium chloride tubes. The reactants are introduced into the reaction tube in stoichiometric proportions. A slight vacuum is maintained by a water aspirator to avoid accumulation of gaseous products and unreacted ketene. Before introducing the reactants, the upper section of the apparatus is cooled to a temperature between −5° C. and −20° C. This preliminary cooling is a safety precaution because of the highly exothermic character of the reaction between the ketene and bromine vapors entering the reactor in the upper portion. This reaction takes place almost instantaneously, and bromine vapors do not have time to liquefy or solidify before the reactor temperature reaches a point above the boiling point of bromine. During the progress of the reaction the refrigeration is continued to the extent necessary to prevent the temperature in the reaction tube from rising above 150° C. Haloacetyl halide is produced by the reaction of the ketene and bromine in the upper portion of the apparatus. In the lower portion of the apparatus, the haloacetyl halide reacts with the alcohol vapor to produce alkyl haloacetate. No unreacted haloacetyl halide reaches the fractionating column, although some acetyl halide is found among the low-boiling substances separated by the fractionating column.

By the process described, we have produced 70–80% yields of ethyl monobromoacetate from ketone, bromine and ethanol vapor; 75–80% yields of ethyl monochloroacetate from ketene, chlorine and ethanol vapor; and 75–80% yields of methyl monobromoacetate from ketene, bromine and methanol, all yields being calculated on the halogen.

Our continuous gas-phase process permits of the production of a large quantity of lower alkyl monohaloacetate in a short time, from the readily available gaseous reactant, ketene. It is not necessary to have a large quantity of any toxic or irritating product present in one container, as is necessary in a batch process for producing alkyl monohaloacetates.

What we claim as our invention and desire to be secured by Letters Patent of the United States is:

1. A continuous process of preparing a lower alkyl monohaloacetate, which comprises reacting ketene with a halogen selected from the group consisting of chlorine and bromine in the vapor phase to give a monohaloacetyl halide while holding the temperature below 150° C. by refrigeration, maintaining the monohaloacetyl halide thus formed in the vapor phase, and reacting it, in another portion of the same apparatus, with a lower aliphatic monohydric alcohol in vapor form.

2. A continuous process of preparing ethyl monobromoacetate, which comprises reacting ketene with bromine in the vapor phase to give monobromoacetyl bromide while holding the temperature below 150° C. by refrigeration, maintaining the monobromoacetyl bromide thus formed in the vapor phase, and reacting it, in another portion of the same apparatus, with ethanol in vapor form.

3. A continuous process of preparing ethyl monochloroacetate, which comprises reacting ketene with chlorine in the vapor phase to give monochloroacetyl chloride while holding the temperature below 150° C. by refrigeration, maintaining the monochloroacetyl chloride thus formed in the vapor phase, and reacting it, in another portion of the same apparatus, with ethanol in vapor form.

4. A continuous process of preparing methyl monobromoacetate, which comprises reacting ketene with bromine in the vapor phase to give monobromoacetyl bromide while holding the temperature below 150° C. by refrigeration, maintaining the monobromoacetyl bromide thus formed in the vapor phase, and reacting it, in another portion of the same apparatus, with methanol in vapor form.

References Cited in the file of this patent

Staudinger: Die Ketene, Enhe, Stuttgart (1912), page 92.

Richter: "Text of Organic Chemistry," 2nd ed., 1948, John Wiley and Sons, pages 182 and 193.